United States Patent [19]

Green et al.

[11] Patent Number: 5,125,488
[45] Date of Patent: Jun. 30, 1992

[54] DRIVE ASSEMBLY HAVING DUAL NEUTRALITY CONTROL

[75] Inventors: Douglas F. Green, Dorrington; Stephen L. Jackson, Bray Park; Steven R. Miatt, Kallangur, all of Australia

[73] Assignee: Rover Mowers Limited, Eagle Farm, Australia

[21] Appl. No.: 635,629

[22] PCT Filed: Jun. 27, 1989

[86] PCT No.: PCT/AU89/00276
§ 371 Date: Jan. 4, 1991
§ 102(e) Date: Jan. 4, 1991

[87] PCT Pub. No.: WO90/00122
PCT Pub. Date: Jan. 11, 1990

[30] Foreign Application Priority Data

Jun. 27, 1988 [AU] Australia ............... PI8988

[51] Int. Cl.⁵ .................................... B60K 41/24
[52] U.S. Cl. .................. 192/4 C; 192/13 R; 74/474; 74/480 R; 474/7
[58] Field of Search .......... 192/3.51, 3.54, 4 R, 192/4 C, 13 R, 4 A; 74/474, 478, 480 R; 474/7

[56] References Cited

U.S. PATENT DOCUMENTS

| | | | |
|---|---|---|---|
| 2,228,917 | 1/1941 | Walls | 192/13 R |
| 2,988,185 | 6/1961 | Pond | 74/478 X |
| 3,124,970 | 3/1964 | Walker | 192/13 R X |
| 3,131,581 | 5/1964 | Greybill | 474/7 X |
| 3,645,368 | 2/1972 | Blaauw | 192/4 C |
| 4,014,419 | 3/1977 | McKnight | 192/13 R |
| 4,248,331 | 2/1981 | Behrens | 192/13 R |
| 4,301,902 | 11/1981 | Gatsos et al. | 192/3.51 X |
| 4,408,683 | 10/1983 | Elmy et al. | 74/480 R X |
| 4,496,035 | 1/1985 | Wanie | 192/4 C |

FOREIGN PATENT DOCUMENTS

| | | |
|---|---|---|
| 402230 | 11/1968 | Australia . |
| 220514 | 8/1924 | United Kingdom . |
| 670803 | 4/1952 | United Kingdom . |
| 899739 | 6/1962 | United Kingdom . |

OTHER PUBLICATIONS

Patents abstracts of Japan, M-56, p. 146 JP,A,5-5-156726 (Hiroyuki Hirata) Dec. 6, 1980.

Primary Examiner—Richard Lorence
Attorney, Agent, or Firm—Amster, Rothstein & Ebenstein

[57] ABSTRACT

A vehicle drive assembly includes a rotating shaft driven by an endless belt which engages and travels about forward and reverse pulleys attached to the shaft and also about an idler pulley which indirectly enables rotation of the forward and reverse pulleys in the forward and reverse directions, respectively. The drive assembly also includes an oscillating clutch assembly, operable by a clutch pedal, which allows both selective engagement of clutch plates with either of the forward and reverse pulleys and neutralization of the clutch assembly. The clutch assembly is also operably linked to the vehicle braking system such that actuation of the brake pedal also effects neutralization of the clutch assembly.

13 Claims, 3 Drawing Sheets

DRIVE ASSEMBLY HAVING DUAL NEUTRALITY CONTROL

The present invention relates to improvements in vehicle drive assemblies and more particularly relates to a drive assembly having a dual neutrality control which provides alternative means for an operator of a device to which the dual neutrality control is fitted to elect which of the neutrality controls may be used to neutralise either the forward or reverse drive modes.

According to prior art operator controlled motor vehicles, which range in variety from lawn mowers and tractors to cars and trucks, operational control of drive systems is assisted by gearing assemblies with the gearing assemblies being selectively operable by use of a clutch which is generally foot operated. A foot pedal generally is linked directly or indirectly to a clutch plate which engages and disengages the engine according to respective retraction or depression of the clutch pedal. When the clutch pedal is depressed the clutch plate disengages the engine and places the vehicle into the neutral mode.

This arrangement has previously been the main commonly employed means for neutralisation of drive assemblies in vehicles. In these assemblies clutch pedal operation is independent of the selected gear at the time the pedal is depressed. If the clutch pedal is to be retracted when a motor is running, it is necessary in manually operated vehicles to shift the gear stick to the neutral position. Gearing neutrality is generally required when the vehicle is to be stopped. Stopping of a manually operable vehicle requires the two actions of depressing the brake pedal and depressing the clutch pedal. If the brake pedal is depressed without depressing of the clutch pedal, the vehicle will stall due to the resistance to motor movement provided by the still engaged clutch plate.

There are in existence other common drive assemblies whereby gearing neutrality and selective engagement may be achieved by simple depression of a clutch pedal. One such drive assembly has been disclosed in Australia patent specification 402230. That document discloses a drive mechanism for rotating a shaft about its axis in either direction comprising; an endless belt driven by a first pulley member and passing around an idler pulley member, a pair of second pulley members rotatably mounted on the shaft and each engaged by a respective run of the endless belt, intermediate the first pulley member and the idler pulley member, for rotation of said two second pulley members in opposite directions, and clutch means on the shaft for rotation therewith and adapted to be actuated to selectively engage either of said pair of second pulley members to rotate the shaft in the direction of the engaged second pulley member.

That drive assembly however, possesses only one neutrality control means whereby a clutch pedal is actuated to neutralise the drive.

The present invention seeks to provide a drive assembly by which enables an operator of a vehicle to which it is attached, to place the vehicle in a neutral gearing mode by optional actuation of either a clutch/brake pedal or gear selection pedal. It has not hitherto previously been known to provide a means for placing a vehicle drive means into neutrality by optional depression of either a clutch pedal or a brake pedal whilst at the same time stopping the vehicle.

In one broad form the invention comprises an improvement to a vehicle drive assembly of the type including a clutch assembly having a clutch pedal operably connected to at least one clutch plate by articulated members, characterised in that the improvement comprises a linkage connecting with a brake on said vehicle, wherein when said brake is depressed said linkage causes the said clutch plate to release from its drive engagement with the vehicle drive means so as to place the gear assembly in neutral mode irrespective of whether the vehicle drive means is operating in the forward or reverse direction before the brake is depressed.

In an alternative form, the invention comprises an improved motor vehicle clutch assembly of the type having a gear selector pedal operably linked to a clutch plate assembly which engages and disengages a vehicle drive means; characterised in that the assembly also comprises a linkage connecting the clutch plate assembly with the brake pedal of said vehicle to provide dual control of the clutch plate assembly wherein the clutch plates of the clutch plate assembly can be placed into a neutral disengaged mode by optional selection by the operator of said vehicle to depress either the brake pedal or the gear selector pedal, and wherein when the said brake is depressed said linkage causes the said clutch plate/s to release from drive engagement with the vehicle drive means so as to place the gear assembly in neutral mode irrespective of whether the vehicle drive means is operating in the forward or reverse direction, said brake pedal when depressed also contemporaneously stopping said vehicle.

In another form the present invention comprises a vehicle drive assembly of the type comprising a rotating shaft driven by means of an endless belt which engages and travels about a forward and reverse pulley attached to said shaft and also about an idler pulley which indirectly rotates the said forward or reverse pulley in either the forward or reverse direction, the assembly also comprising an oscillating clutch assembly operable by a clutch pedal which selectively engages either the forward or reverse pulley or neutralises, said clutch means, characterised in that the drive assembly also comprises additional means to effect neutralisation of said clutch, comprising a linkage between the vehicle's braking system and said clutch assembly.

In its broadest form the present invention comprises a gearing assembly for a motor vehicle wherein the gearing can be placed in a neutral mode from a drive mode by optional actuation of either the brake or gear selector of said vehicle.

In the preferred embodiment, the linkage between the brake pedal and the clutch assembly is effected by means of a spring biased rod. Also, in the preferred embodiment, the clutch assembly includes two friction clutch plates which are mounted between spaced apart forward and reverse drive pulleys which are rotationally mounted on a drive shaft. The friction clutch plates are concentrically mounted on and are keyed to the drive shaft. The plates are engagable and releasable from drive engagement with the drive pulleys in response to actuation of either the control pedal or the brake pedal. Preferably the dual neutrality control drive assembly is for use with ride on lawn mowers however, it is intended that the drive assembly having the dual neutrality control would be suitable for other vehicles.

The invention will now be described in more detail according to a preferred but non limiting embodiment and with reference to the accompanying illustrations wherein.

The dual neutrality control mechanisms of the present invention will be described in their application to one particular drive assembly. The fact that the invention is described in its incorporation with one particular drive assembly should not be construed as limiting of the invention to that particular assembly as it is feasible to adapt the present invention to other drive mechanisms.

Figure 1:
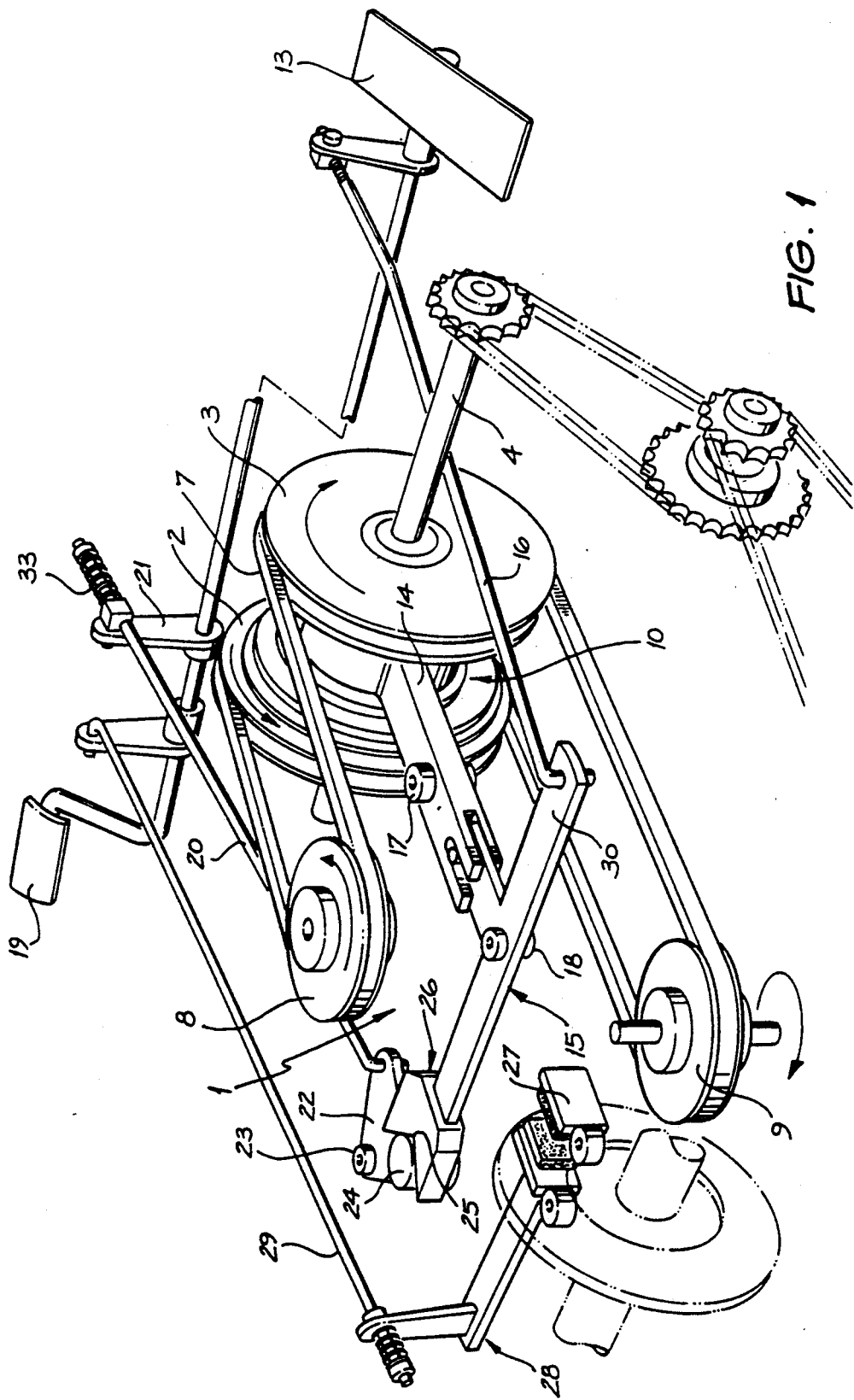
FIG. 1 shows a drive assembly for a vehicle incorporating the combination gear and braking assembly having the dual neutrality control according to a preferred embodiment of the present invention.

Referring to FIG. 1 there is shown a drive assembly for a motor vehicle having in conjunction therewith a gearing assembly 1 wherein the assembly has dual control means to enable neutralisation of the gearing upon actuation of one or other of the dual control means. The drive assembly typically comprises an engine (not shown) which may be mounted either at the rear or front of the vehicle. Power from the engine is transmitted to spaced apart drive pulleys 2 and 3 via return pulley 9 by means of an endless belt drive 7. The drive pulleys 2 and 3 are adapted for contra rotation under the action of drive belt 7 which changes direction about belt return pulleys 8 and 9, thus causing pulley 3 to rotate in a forward direction and pulley 2 to rotate in the reverse direction. The drive pulleys 2 and 3 operate independently of drive shaft 4 until such time as clutch plates 5 or 6 contact respective pulleys 2 or 3.

Figure 2:
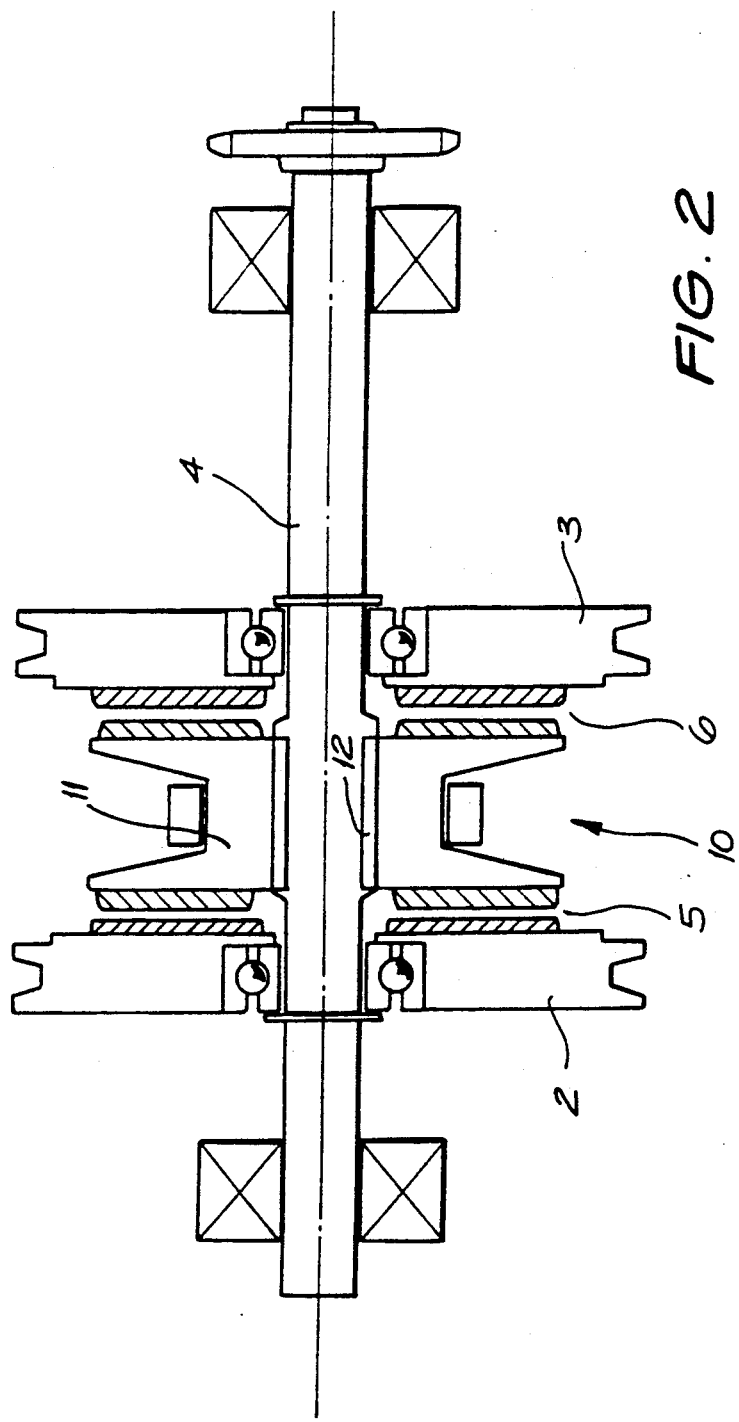
FIG. 2 shows a plan view of the drive assembly showing the friction plates and drive pulleys assemblies.

Attached to the drive shaft 4 as shown in FIG. 2 is a clutch plate assembly 10 which comprises hub 11 and previously mentioned clutch plates 5 and 6. The hub 11 is according to one embodiment connected to drive shaft 4 and is enabled to rotate with shaft 4 by means of keys 12. The keys ensure there is no relative rotation between the assembly 10 and shaft 4. The clutch plate assembly 10 is indirectly attached to the gearing control pedal 13 via strut 14, T bar 15 and linkage rod 16; see FIG. 1. Strut 14 is adapted to pivot about pivot pin 17 and T bar 15 is adapted to pivot about pin 18 in response to actuation of either the brake pedal 19 or the control pedal 13. The brake pedal 19 and control pedal 13 are the primary means by which selection to one of the dual neutrality means may be achieved by an operator. The brake pedal 19 is operably connected to the T bar 15 and hence indirectly to the clutch plate assembly 10 by means of rod 20. The rod 20 is joined at one of its ends to mounting arm 21 and at its opposite end to cam plate 22. Rod 20 is also adapted at one end with a biasing restoring spring 33. The plate 22 is pivotally attached to pivot pin 23 and allows a camming arrangement to be effected by interaction between boss 24 and throat 25 in the jaws 26 located at the end of T bar 15.

The effect of the camming action between boss 24 and throat 25 is to shift the clutch plate assembly from an engaged position, whether forward or reverse, into a neutral position when brake pedal 19 is depressed. The brake pedal 19 also operates in conventional fashion to actuate braking calipers 27 via rod 29 and elbow 28.

Figure 3:
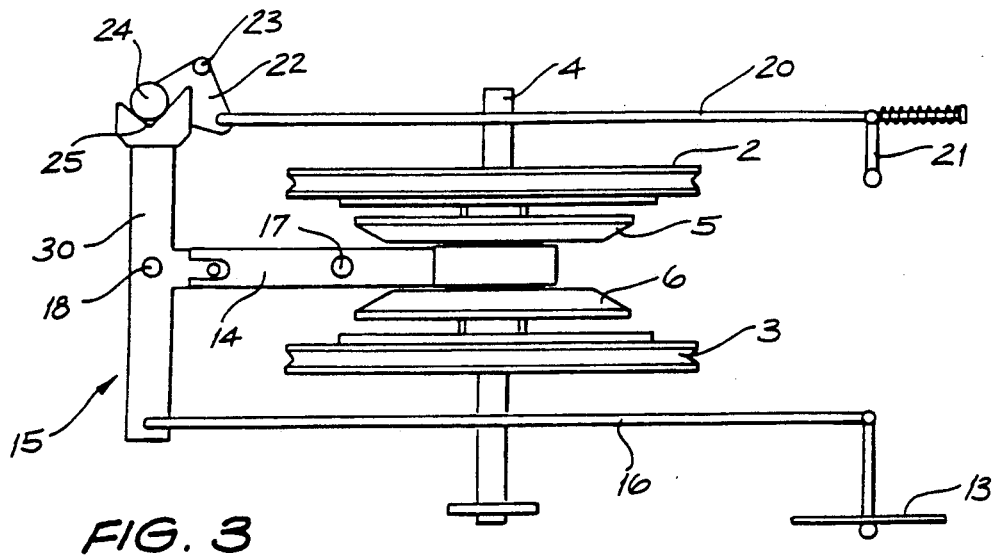
FIG. 3 shows the drive assembly incorporating the dual neutrality control wherein the clutch assembly is placed in the neutral position.

The operational relationship between the brake pedal and the clutch plate assembly 10 in order to effect gearing neutrality will now be described beginning with clutch plate assembly 10 in the neutral position as shown in FIG. 3.

The clutch assembly is placed initially in a neutral position by disposition of control pedal 13 in a substantially horizontal attitude. When the clutch plates are in the neutral position the elongated leg 30 of T bar 15 is effectively parallel with drive shaft 4. When the engine is running and with the gearing in neutral, drive pulleys 2 and 3 spin freely about shaft 4 which is stationary. If the brake pedal 19 is depressed whilst the clutch plates are disengaged or in the neutral mode only braking will occur due to the fact that the tensile force generated along rod 20 is translated into a moment in cam plate 22 about pin 23 thence into an axial force along leg 30 via boss 24 and through pin 18. As no moment is created about pin 18 no movement can occur in the clutch plate assembly if the brake pedal is depressed due to the axial alignment of boss 24 with pin 18 and the consequent lack of moment generating eccentricity between the boss 24 and pin 18. Thus the brake is operable to achieve neutrality only when it is depressed during forward or reverse drive.

Figure 4:
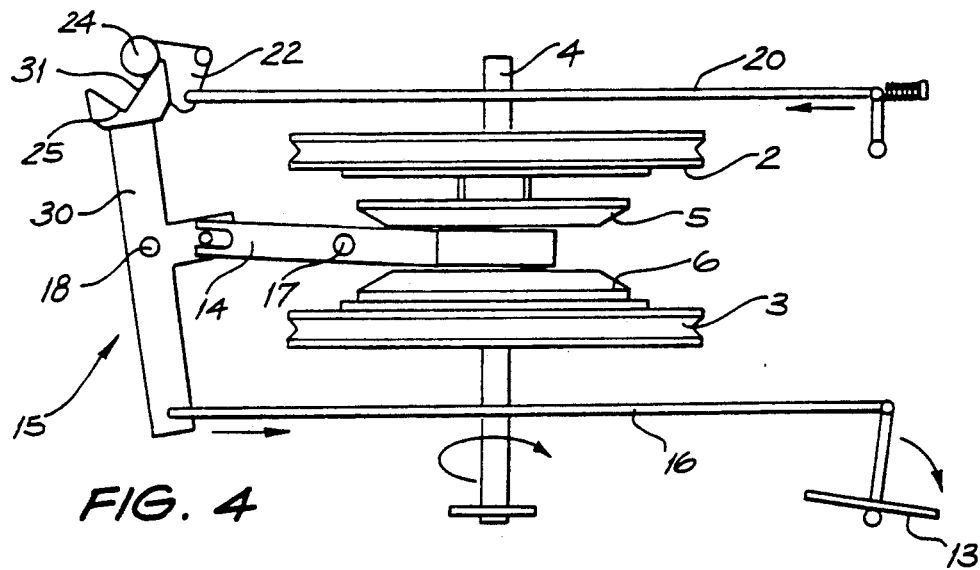
FIG. 4 shows the drive assembly incorporating the dual neutrality control wherein the forward drive friction plate is in contact with the forward drive pulley.

If the forward gearing is to be selected, pedal 13 is placed in the forward attitude as shown in FIG. 4. This creates a tensile force on rod 16, which causes pivoting of T bar 15 about pin 18 thereby causing pivoting of strut 14 about pin 17 to urge clutch plate 6 into contact with drive pulley 3. This action then imparts forward motion to the vehicle via rotation of shaft 4 which is linked to the vehicles rear axle by a drive chain.

Figure 5:
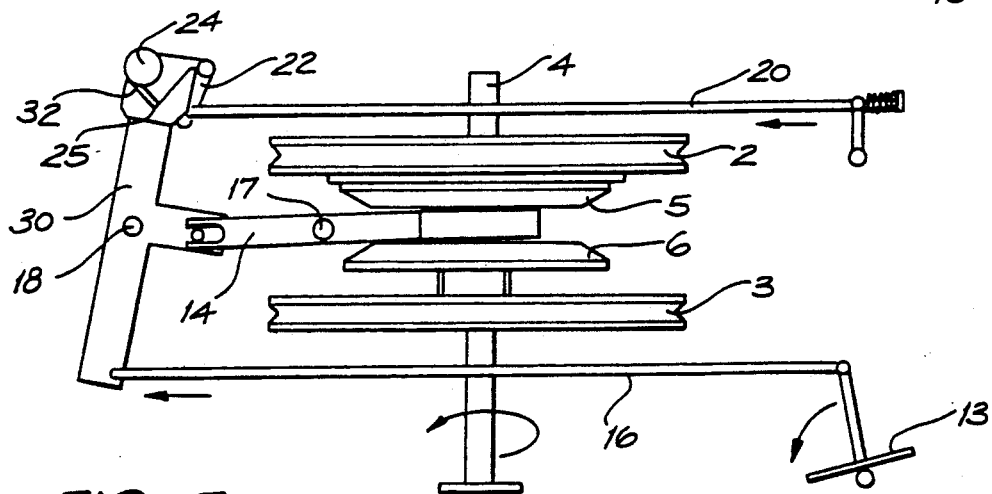
FIG. 5 shows the drive assembly incorporating the dual neutrality control wherein the reverse drive friction plate is in contact with the reverse drive pulley.

FIG. 5 shows the clutch assembly 11 placed in the reverse mode whereby plate 5 comes into contact with pulley 2. This action is effected by placing pedal 13 into the reversing attitude as shown in FIG. 5. It is open to the operator of the vehicle to disengage the clutch plates from the drive pulleys 2 or 3 by placing the clutch pedal 13 into the horizontal position.

As an alternative and in accordance with one embodiment of the invention, it is open to the operator to place the gearing into neutral by depression of the brake pedal 19. When the gearing is engaged in the forward mode as shown in FIG. 4 the relative positions of the boss 24 and throat 25 of jaws 26 create a camming action, when the brake pedal is depressed. Tension on rod 20 rotates cam plate 22 about pin 23 causing boss 24 to move along edge 31 in the direction of throat 25 ultimately bringing T bar 15 into parallel alignment with shaft 4 when boss 24 is deep inside throat 25. This action releases clutch plate 6 from pulley 3 thereby placing the vehicle in neutral as shown in FIG. 3.

A similar principle occurs in placing the vehicle in neutral from the reverse drive. When the drive is in reverse the T bar 15 is as shown in FIG. 5. In this case, when brake pedal 19 is depressed the rotation of plate 22 about pin 23 causes boss 24 to engage edge 32 of throat 25 thereby urging the T bar 15 into parallel relation with shaft 4. As previously described this draws clutch plate 5 away from pulley 2 by virtue of the consequential movement of strut 14 about pin 17 in response to the pivoting movement of T bar 15 about pin 18.

Re engagement of the clutch plates into a forward or reverse drive mode is effected by re-actuation of pedal 13 which has been returned by depression of the brake pedal to a horizontal attitude and into the neutral position in consequence of the rotation of T bar 15. The brake pedal 19 acts in addition to its braking function to overide the clutch pedal 13 when neutralising the gears.

Although the invention is described in general terms for motor vehicles the present invention is particularly applicable for ride on lawn mowers, however, this application is not to be construed as a limitation on the applications of the invention.

It will be recognised by persons skilled in the art that numerous variations and modifications can be made to the present invention as broadly described herein without departing from the overall spirit and scope of the invention.

We claim:

1. A vehicle drive assembly of the type comprising a rotating shaft driven by means of an endless belt which engages and travels about forward and reverse pulleys attached to said shaft and also about an idler pulley which indirectly enables rotation of said forward and reverse pulleys in the forward and reverse directions, respectively, said drive assembly also comprising an oscillating clutch assembly operable by a clutch pedal which allows both selective engagement of clutch plates with one of said forward and reverse pulleys at a time and neutralisation of said clutch assembly;

said drive being characterized by also comprising means operably linked to the vehicle brake assembly to effect neutralisation of said clutch assembly when the brake pedal of the vehicle brake assembly is actuated, thereby to neutralize said drive assembly.

2. The vehicle drive assembly of claim 1, wherein said clutch assembly includes an articulated selector arm having first and second ends and a cam plate engaging said first end of said selector arm, said operably linked means comprising a linkage member operably linking the brake pedal and said cam plate.

3. The drive assembly of claim 2 wherein said linkage member comprises a rod having a first end operably engaging the brake pedal and a second end pivotally engaging said cam plate.

4. The drive assembly of claim 3 wherein said cam plate has a boss thereon which engages a set of jaws on the said first end of said selector arm, said selector arm being pivotally anchored to enable movement of said clutch assembly, responsive to selective actuation of either of the clutch pedal and the brake pedal, from a preselected forward drive mode to a neutral mode or from a reverse drive mode to the neutral mode.

5. The drive assembly of claim 4 wherein upon actuation of the brake pedal, said selector arm is moved from either of the preselected forward mode and the reverse mode to the neutral mode by an operable engagement between said boss and said jaws which neutralises said clutch assembly.

6. The drive assembly of claim 5 wherein said cam plate is pivotally anchored to the vehicle body to enable an operable engagement between said boss and said set of jaws.

7. The drive assembly of claim 6 wherein said boss, in conjunction with said cam plate, upon actuation of the brake pedal moves between extreme positions at or near the extremities of one or the other of the jaws of said set of jaws, respectively, to an intermediate position in the throat of said set of jaws, thereby to effect neutralization of said clutch assembly.

8. the drive assembly of claim 7 wherein when said boss is in one of said extreme positions said drive assembly is in a forward drive mode, and when said boss is in the other of said extreme positions said drive assembly is in a reverse drive mode.

9. The drive assembly of claim 2 wherein said linkage member is a rod connected to the vehicle brake assembly via offset means which results in said rod being offset from the vehicle brake assembly.

10. The drive assembly of claim 2 wherein said linkage member biased by means of a compression spring.

11. The drive assembly of claim 2 wherein said selector arm is configured in the shape of a T.

12. The drive assembly of claim 2 further comprising a control rod linking the second end of said selector arm to said clutch pedal and enabling neutralisation of said clutch assembly when said clutch pedal is actuated.

13. The drive assembly of claim 1 wherein the vehicle is a ride-on lawn mower.

* * * * *